United States Patent
Harris

(10) Patent No.: US 11,875,786 B2
(45) Date of Patent: Jan. 16, 2024

(54) NATURAL LANGUAGE RECOGNITION ASSISTANT WHICH HANDLES INFORMATION IN DATA SESSIONS

(71) Applicant: Scott C Harris, San Diego, CA (US)

(72) Inventor: Scott C Harris, San Diego, CA (US)

(*) Notice: Subject to any disclaimer, the term of this patent is extended or adjusted under 35 U.S.C. 154(b) by 543 days.

(21) Appl. No.: 16/814,713

(22) Filed: Mar. 10, 2020

(65) Prior Publication Data
US 2021/0287666 A1    Sep. 16, 2021

(51) Int. Cl.
*G10L 15/00* (2013.01)
*G10L 15/18* (2013.01)
*G10L 15/22* (2006.01)

(52) U.S. Cl.
CPC .............. *G10L 15/18* (2013.01); *G10L 15/22* (2013.01); *G10L 2015/223* (2013.01)

(58) Field of Classification Search
USPC ................ 704/1–275; 381/21–61, 110–121; 706/1–62, 900–903
See application file for complete search history.

(56) References Cited

U.S. PATENT DOCUMENTS

| | | | |
|---|---|---|---|
| 9,753,912 B1* | 9/2017 | Roy | G06F 40/205 |
| 2013/0297320 A1* | 11/2013 | Buser | B29C 64/118 |
| | | | 704/E21.001 |
| 2015/0039317 A1* | 2/2015 | Klein | G06F 3/167 |
| | | | 704/275 |
| 2019/0044741 A1* | 2/2019 | Middleton | G06F 16/27 |
| 2019/0124159 A1* | 4/2019 | Alsina | H04N 21/2543 |
| 2019/0243606 A1* | 8/2019 | Jayakumar | H04R 3/12 |
| 2019/0295541 A1* | 9/2019 | Pelton | G10L 15/26 |
| 2020/0152186 A1* | 5/2020 | Koh | G10L 15/08 |
| 2021/0304750 A1* | 9/2021 | Yen | G10L 15/26 |

FOREIGN PATENT DOCUMENTS

KR    20200007926    *  1/2020    ........... G10L 15/222

* cited by examiner

*Primary Examiner* — Marcellus J Augustin
(74) *Attorney, Agent, or Firm* — Scott C Harris, Esq

(57) ABSTRACT

A Natural Language Command system, which receives Natural Language Commands either over a voice system or over a text system. The commands are associated with the session, and thus can be modified.

16 Claims, 2 Drawing Sheets

NATURAL LANGUAGE RECOGNITION ASSISTANT WHICH HANDLES INFORMATION IN DATA SESSIONS

BACKGROUND

Voice assistants are personal helpers that typically operate when using personal devices.

A voice assistant typically monitors for the mention of a keyword that indicates the voice assistant should begin operation. Different keywords for the most popular voice assistants include the word "Alexa", "okay Google" or "Hey Siri". Upon detecting those keywords, the voice assistant uses language processing to determine what the user says, and then attempts to follow that request.

The voice assistant often requires Internet interaction in order to assist with the voice processing. That is, a typical interaction with a voice assistant monitors for a keyword, listens for words/commands after the keywords, and then takes some action.

SUMMARY it is recognized that the voice assistant is based on the desire to do things "right now". If you want to know something right now, you ask your voice assistant. It is an easy task, for example, for a voice recognizing system to carry out one action such as finding out a fact (e.g., who is the president of the United States?) or carrying out a simple action (such as 'turn on the lights in my bedroom', or 'turn on my flashlight').

However, these voice recognition systems can only do certain simple things. It has not been previously possible or easy to carry out more complicated tasks.

According to an embodiment, a natural language recognition device is described which operates based on data sessions. A session is defined by a user attempting to communicate with the natural language recognition system. Once the session has been established, the user can stack commands by carrying out actions within the session. More specifically, the user can add new individual commands to a session, and can add global commands to a session that modify how the system carries out one or more of its individual commands.

According to an embodiment, the natural language recognition device can accept text based commands, such as SMS text messages or messages from an instant messaging system.

The device can also accept voice commands.

According to an embodiment, the session stays open until it is ended by a specified criterion, such as a sufficient amount of time passing, or an indication that the session should be ended.

According to another embodiment, the session enables different kinds of follow-ups and clarifications.

BRIEF DESCRIPTION OF THE DRAWINGS

These and other aspects will now be described with reference to the accompanying drawings wherein.

DETAILED DESCRIPTION

Figure 1:
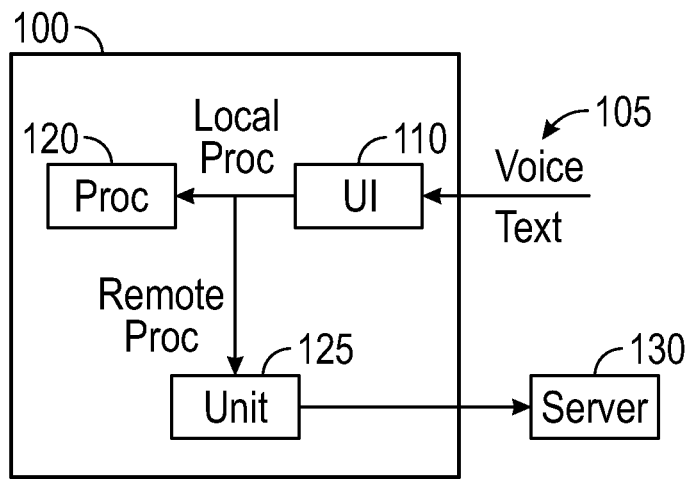
FIG. 1 shows a block diagram of a system that is used.

FIG. 1 shows a block diagram of a system that can be used according to the present application. A portable device 100 can be a portable phone or tablet or any other kind of device. While this describes doing this on a portable device, it should be understood that these operations can be carried out on any computer, such as a desktop computer.

The computer, e.g., a portable phone or other portable device receives Natural Language Commands at 105, which can be voice commands, or text based commands that are typed into a text based system. These commands are received into a user interface 110, and can be sent to a local processor 120 and also via a communication device 125 to a remote processor 130 shown as a server.

Figure 2:
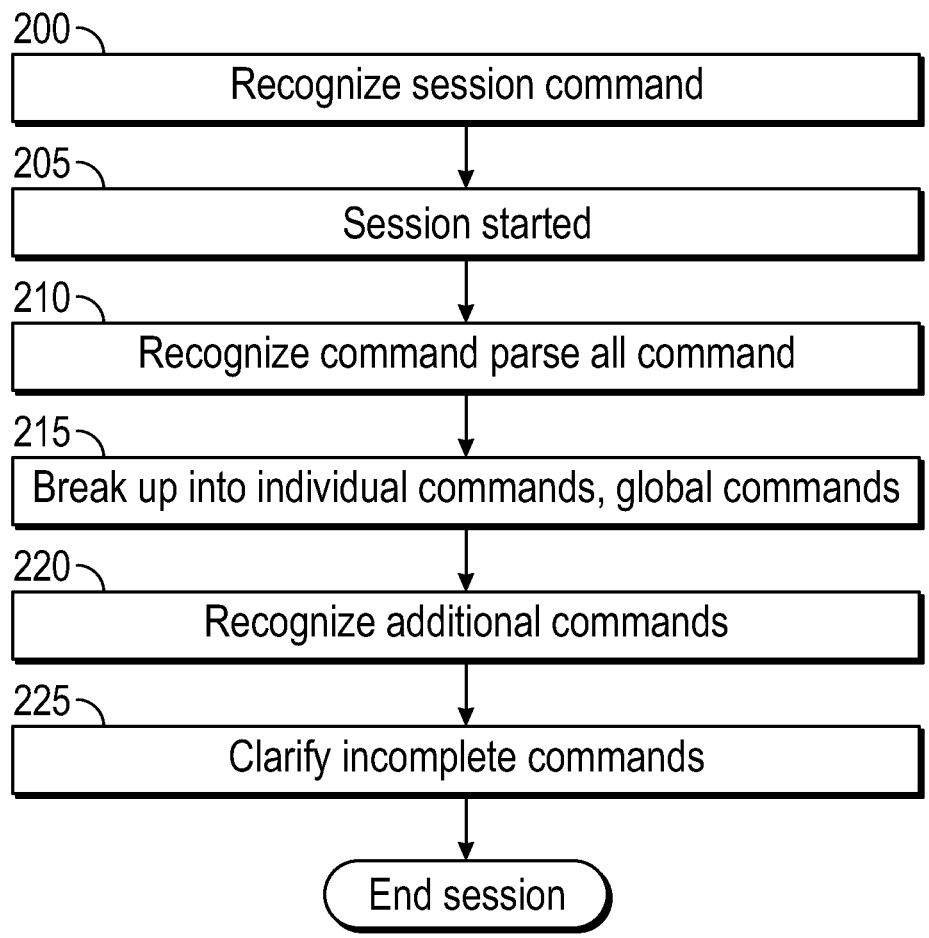
FIG. 2 shows a basic flowchart of operation of dividing into sessions.

The operation of the processor(s) can be as shown in FIG. 2. In one embodiment, the processing can be carried out as conventional, with a simple one line command, such as 'Alexa turn on the lights'.

However, according to an embodiment, the processor recognizes a command such as the above, and recognizes that to indicate that it should begin a command recognition session at 200. Responsive to recognizing the session command, the session is started at 205. During the session, anything that is received into the user interface can add to the commands to become part of the ongoing session.

Take an example, of user carrying out the desire to create a song playlist. The user can start this out by starting the session command by saying a recognized command, such as "hey open a session", or some other recognized phrase, such as "add to an existing ongoing session". At this point, the user tells the system what the user wants to do, because the system is listening for commands.

Take an example, where the user says "Please play the following songs, brown sugar by the Rolling Stones, bees in the trap by Nikki Minaj, and then play 30 minutes of classic rock, 2 songs of 1950s Louis Armstrong Jazz, and don't play anything that sounds like country".

At 210, the natural language system recognizes the words were recognizes the phrases and parses this into multiple different commands. In the example given above, this could include 1) Play specific songs: play brown sugar by the Rolling Stones, then bees in the trap by Nikki Minaj, 2) play 30 minutes of classic rock after that, 3) play two songs of Louis Armstrong Jazz after that, 4) for each of 2 through 3 (where the system is choosing the songs), don't play anything that sounds like country music.

These commands are than stacked, to create a list of different operations that should occur. At 215, these are broken up into different kinds of commands. Based on the information of this thing, this can be broken up into individual commands, and global commands. In the example above, numbers 1 through 3 are individual commands, and number 4 is a global command.

For example, number 1 can analyze the user's access to different kinds of music databases, such as Apple music (TM), Amazon music (TM) and the like. This can find the specific song being asked for. Since this is a specific command, command number 4 is ignored, since the user has given a specific command, this overrides the global commands.

For number 2, the system can again analyze the user's access to different kinds of music databases, such as Pandora (TM). The system then accesses Pandora looking for classic rock. However, for each individual song that is played, the system must determine if this sounds like country based on the global command in 4, and may choose to either play or skip that song. As an alternative, the system may consult an internal database to choose songs from a different kind of music database.

For element number 3, again the system consults a music database.

Additional commands are also possible. For example, while the session is open, a user can issue commands about where the music should be played. One example—the user can say "play this on my smart speaker located in my living room". This can be evaluated as a global command, and therefore applicable to each of the previous commands.

In this way, as long as the session is open, each command is used as either a new command or is used to modify one or more previous commands.

Other commands are also possible during a session, as described herein. At some point the session must be ended, and according to the present embodiment this can be ended in different ways. The session for example can automatically be ended by the user saying another keyword, such as in the supersession. The session can automatically be ended after one minute of silence. Alternatively, the user can specify as another global command when the session should be ended. For example, the user can specify keep this session open until all of the tasks in this session are completed.

In one embodiment, an open session can become partially inactive after a certain amount of time. For example, users can provide a set of commands during the session as described herein. The session for example can be for 30 seconds after opening the session. After the session is no longer active (in an embodiment after those 30 seconds), the system recognizes additional commands at 220 only when those additional commands include an additional keyword, such as "continue command session", then other commands such as "let's display photos", or "let's play this on my living room speaker". That is, during the session, additional commands can be added during the command session or by re-opening the command session. However, even though the command session is still able to accept commands, the user can still use their phone in the normal way between commands, and then re-open a command with a special command reopen command.

Other examples of additional commands that can be received at 220 might include "change where this music is being played from my living room speaker to my dining room speaker". "Unless I tell you differently, keep displaying this on my TV". When the system tells to display on the TV, the live TV can be paused by storing the video, doing the commanded things, and then when finished playing the TV from the pause cache. As an alternative, the operation can put the commanded operation into a picture-in-picture, and turn subtitles on.

The above has described how to do this with a voice recognition system. However, the same kinds of commands can be used with a textual system. The session command can be initiated by sending a textual message, e.g., a SMS text, or email or other text message to a specified text receiving address, such as "open supersession".

Once the session is started, additional commands can be sent by sending them to the same supersession address, or to a special text address such as "supersession continue" or by replying to a message received from the session software, where that message includes unique session information included as part of the return address.

Figure 3:
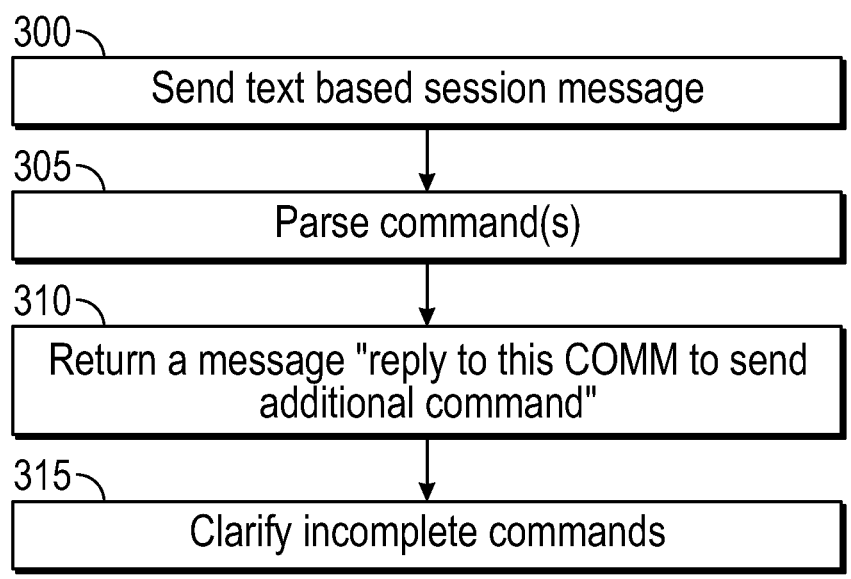
FIG. 3 shows a flowchart of operation that is specific to text based natural language commands.

FIG. 3 illustrates a flowchart of operation, where a text is initially sent to a text based session message addressed such as "hey supersession" at or to a special number that represents the hey supersession text receiver, or to an email address such as hey@supersession.com.

After receiving this message, the remote system parses the commands at 305 and returns a message at 310 that says "reply to this communication to send additional commands" this provides a special email or text message that allows users to send additional commands to the system. In this embodiment, the session can be closed in any of the ways discussed above, or can simply stay open so long as the textual address is used. The textual address can include, for example, a unique descriptor that can uniquely identify the session.

An important feature of this system, which is available in all the embodiments, is the ability to clarify incomplete commands. This is shown as 315 in FIG. 3, and also shown as 225 in FIG. 2. The incomplete commands can be anything that the natural language system does not completely recognize. For example, in the example given above, the user has said "play all of this on my smart device in my living room". The smart device in the living room might have information in it indicating that it is the living room smart device, but if it does not, then the system might not know how to figure out which one is the smart device in the living room.

When that happens, clarification is requested at 315. This clarification in this particular example can be a message back saying something like "I don't know which is your living room speaker, can you tell me more?" This can provide as much or as little information as the system is able to figure out. For example, it may say "I found the following 3 speakers in your house", and explain everything it knows about each of the speakers, such as the brand name of the speaker, and anything that might know about the location of the speaker.

The user can then say play at all on speaker number 3 or play on the hitach speaker.

In a similar way, words that the system doesn't understand can be returned, I don't know what you mean by "Nederlander", can you explain?

For the textual system, the session can stay open indefinitely, since a unique code can be used for each session. Alternatively, one of the Natural Language Commands can simply be and this session.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A natural language recognition system, comprising:
a portable computer device, having a processor and a user interface;
the processor receiving an initial command in natural language, and operating to assign a session to the initial command, and to accept multiple different subsequent commands during the session at different times during the session subsequent to receiving the initial command as part of the session; and the processor operating to maintain the session as open until a session ending event, and to close the session responsive to the session ending event, and while the session is open, to accept and carry out each of the subsequent commands, during the session,
the processor receiving a first command while the session is open as a new command to carry out a new function in the session, and receiving a second command while the session is open and using the second command to modify one or more previous commands in the session including the initial command and the subsequent commands, the processor recognizing the second command after the close of the session, but not using the second command after the close of the session to modify the one or more of the previous commands including the initial command and the subsequent commands that were received during the session being open.

2. The system as in claim 1, wherein the processor receives the commands via voice commands, where an initial voice command is made which is a unique command that indicates that a voice command will follow and the processor recognizes subsequent commands that are part of the session, where the session ending event is a specified time after receiving the initial command.

3. The system as in claim 1, wherein the processor receives the commands via voice commands, where after the close of the session, the processor recognizes a unique command that indicates that new commands should be associated with the session and after receiving the unique command, then the processor recognizing the second command to modify the initial command or the subsequent commands received during the session being open.

4. The system as in claim 1, wherein the processor sends information requesting clarification of incomplete or unrecognized commands to a user, and receives information indicative of the response, and uses the response to clarify a previously-provided command.

5. The system as in claim 1, wherein the commands are received as commands are received as textual commands, and the session is associated with a unique session ID which is associated with additional commands to be received for the session.

6. The system as in claim 5, wherein the unique session ID is included as part of a return address and additional commands are sent to the return address that includes information about the unique session ID.

7. The system as in claim 1, wherein the processor processing each of the commands by assigning a new content command to play specific media content, and assigning a format command to play a format of media content, and assigning a global command to set a limit on the media that is played as part of the format of media set by the format command.

8. The system as in claim 1, wherein the commands include a global command to play specified content on a specified content receiving system.

9. A method of operating a natural language recognition system, comprising:

receiving, into an electronic device, an initial command in natural language;

opening a session for the initial command;

receiving additional commands into the session while the session is open;

processing the additional commands while the session is open, including:

processing a new command to carry out a new function in the session;

and processing a global command to modify one or more previous commands received in the session;

detecting a session ending event, and closing the session responsive to the session ending event, after closing the session, accepting commands as new commands not associated with the session, and where said commands received after closing the event do not modify any of the previous commands received during the session, including, after closing the session, recognizing the global command after the close of the session, but not using the global command after the close of the session to modify the one or more of the previous commands.

10. The method as in claim 9, wherein the receiving is via voice commands, where an initial voice command is made which is a unique command that indicates that a voice command will follow, and where subsequent commands that are part of the session are within a specified time of receiving the initial command and after the specified time, ends the session and does not recognize the commands to modify the session.

11. The method as in claim 9, wherein the receiving is via voice commands, where after the close of the session, recognizing a voice command that reopens the session and accepts at least one new command is accepted to modify the initial command or the subsequent commands received during the session being open.

12. The method as in claim 9, wherein the processor sends information requesting clarification of incomplete or unrecognized commands to a user, and receives information indicative of the response, and uses the response to clarify a previously-provided command.

13. The method as in claim 9, wherein the commands are received as commands are received as textual commands, and the session is associated with a unique session ID which is associated with additional commands to be received for the session.

14. The method as in claim 13, wherein the unique session ID is included as part of a return address and additional commands are sent to the return address that includes information about the unique session ID.

15. The method as in claim 9, further comprising processing each of the commands by assigning a first command to be a new command to play specific media content, and assigning a second command to play a format of media content, and assigning a global command to set a limit on the media that is played as part of the format of media set by the second command; and media content based on each of the first command, the second command and the global command.

16. The method as in claim 9, wherein the commands include a global command comprises a command to play specified content on a specified content receiving system.

* * * * *